(12) United States Patent
Sakamoto et al.

(10) Patent No.: US 7,848,056 B2
(45) Date of Patent: Dec. 7, 2010

(54) THIN FILM MAGNETIC HEAD HAVING THERMAL EXPANSION LAYER FOR SUPPRESSING THERMAL PROTRUSION

(75) Inventors: Takamitsu Sakamoto, Tokyo (JP); Naoto Matono, Nagano (JP); Noriaki Kasahara, Tokyo (JP); Shin Narushima, Tokyo (JP); Hiromichi Umehara, Tokyo (JP)

(73) Assignees: TDK Corporation, Tokyo (JP); SAE Magnetics (H.K.) Ltd., Hong Kong (CN)

( * ) Notice: Subject to any disclaimer, the term of this patent is extended or adjusted under 35 U.S.C. 154(b) by 895 days.

(21) Appl. No.: 11/730,155

(22) Filed: Mar. 29, 2007

(65) Prior Publication Data

US 2008/0239583 A1  Oct. 2, 2008

(51) Int. Cl.
   *G11B 5/127* (2006.01)
(52) U.S. Cl. .............................. 360/125.32; 360/125.75
(58) Field of Classification Search ................................. 360/125.02–125.32
   See application file for complete search history.

(56) References Cited

U.S. PATENT DOCUMENTS 7,391,590 B2 * 6/2008 Matono et al. ......... 360/125.32

2006/0087765 A1 * 4/2006 Iwakura et al. ............. 360/125

FOREIGN PATENT DOCUMENTS

| JP | A 5-182133 | 7/1993 |
| JP | A 6-168418 | 6/1994 |
| JP | A 2003-248907 | 9/2003 |

* cited by examiner

*Primary Examiner*—A. J. Heinz
(74) *Attorney, Agent, or Firm*—Oliff & Berridge, PLC

(57) ABSTRACT

A thin film magnetic head includes a main magnetic pole layer conducting a magnetic flux to the recording medium so that the recording medium an be magnetized in a direction orthogonal to a surface thereof; a return yoke layer disposed on a trailing side of the main magnetic pole layer; an intermediate protective layer partially disposed on a magnetic shield layer; and a thermal expansion suppressing layer having an edge located on the intermediate protective layer and being in contact with the return yoke layer in an area where the intermediate protective layer is not formed. If the thin film magnetic head is affected by ambient temperature environment, the thermal expansion suppressing layer suppresses the shift of the main magnetic pole layer and the return yoke layer toward the air bearing surface. This suppresses thermal protrusion from occurring on the thin film magnetic head due to ambient temperature environment.

12 Claims, 10 Drawing Sheets

THIN FILM MAGNETIC HEAD HAVING THERMAL EXPANSION LAYER FOR SUPPRESSING THERMAL PROTRUSION

BACKGROUND OF THE INVENTION

1. Field of the Invention

The present invention relates to a thin film magnetic head equipped with a magnetic conversion element, and a manufacturing method thereof, as well as a head gimbal assembly, a head arm assembly, and a magnetic disk device, each of which is equipped with a thin, film magnetic head.

2. Description of the Related Art

Conventionally, a magnetic disk device has been used as one for performing write and read of magnetic information (hereinafter referred to simply as information). The magnetic disk device has, within a casing, for example, a magnetic disk where information is stored, and a thin film magnetic head for performing write of information into the magnetic disk and read of information written in the magnetic disk. The magnetic disk is supported by a rotation shaft of a spindle motor fixed to the casing, and is rotated about the rotation shaft. On the other hand, the thin film magnetic head is formed on one side surface of a magnetic head slider provided at one end of a suspension, and includes a magnetic write element and a magnetic read element each having an air bearing surface (ABS) opposed to the magnetic disk. In particular, as a magnetic read element, an MR element exhibiting magnetoresistive (MR) effect is generally used. The other end of the suspension is fixed to a tip of an arm supported rotatably by a fixed shaft.

Meanwhile, in the recent years, as the tendency of high density writing (the tendency of large capacity) of magnetic disks is advanced, the tendency of a reduction in write track width is advanced. As the write track width is narrower, the dimension of the thin film magnetic head is smaller. Thus, the signal write capability of the magnetic write element into the magnetic disk is weakened, and the strength of a signal magnetic field from the magnetic disk is also weakened. In order to compensate for deterioration in these functions, it is required to generate a stronger write magnetic field, and further reduce magnetic spacing (bring the ABS of the thin film magnetic head close to the magnetic disk surface).

To this end, it can be considered, for example, to pass greater write current during the time of information write operation. However, when large current is passed, the thin film magnetic head itself generates heat, so that expansion toward the magnetic disk, so-called thermal protrusion may take place. If the thermal protrusion occurs, there is the risk of lack of reliability as a magnetic write device.

A large number of techniques of suppressing the occurrence of thermal protrusion have been reported so far. Firstly, for example, in Japanese Unexamined Utility Model Application Publication No. Hei 2-101308, Japanese Unexamined Patent Application Publications Nos. 2004-2203, 2004-362660, and 2003-91802, it is disclosed to suppress the occurrence of thermal protrusion in the following manner that heat dissipation properties are improved by disposing a heat dissipating layer formed of metal on a magnetic layer (a first manner). Secondly, for example, in the specification of U.S. Pat. No. 6,842,308 and the specification of U.S. Pat. No. 6,989,963, it is disclosed to suppress the occurrence of thermal protrusion in the following manner that heat dissipation properties are improved by disposing a heat dissipating layer formed of material having a large thermal conductivity so as to cover a thin film coil for generating a magnetic flux (a second manner). Thirdly, for example, in "On the Thermal Behavior of Giant Magnetoresistance Heads" B. K. Gupta, Kenneth Young, Samerra K. Chilamakuri, Aric K. Menon, p. 380-387, vol. 123, April 2001, or the like, it is disclosed to suppress the occurrence of thermal protrusion in the following manner that a thermal expansion suppressing layer formed of material, having a small coefficient of thermal expansion and a large thermal conductivity, is disposed directly on a magnetic layer in order to improve heat dissipation properties and also suppress the magnetic layer and the like from shifting toward a magnetic disk (a third manner). Fourthly, for example, in Japanese Unexamined Patent Application Publication No. 2005-285236, it is disclosed to suppress the occurrence of thermal protrusion in the following manner that a thermal expansion suppressing layer similar to the above is disposed on a magnetic layer with a protective layer formed of alumina in between, in order to prevent the magnetic layer and the like from shifting toward a magnetic disk (a fourth manner).

SUMMARY OF THE INVENTION

However, in the first manner, the metal having a large coefficient of thermal expansion is used for the heat dissipating layer, and thus there is the risk that thermal protrusion may occur under the influence of ambient temperature environment. In the second manner, because the heat dissipating layer is disposed around the thin film coil for generating a magnetic flux, the volume of the heat dissipating layer may be limited and hence the effect of improving heat dissipation properties and suppressing thermal protrusion seems not so high. Additionally, it is not easy to dispose the heat dissipating layer around the thin film coil, and thus the process may be limited.

Whereas in the third manner, by virtue of the thermal expansion suppressing layer, there is little or no risk of the occurrence of thermal protrusion due to the influence of ambient temperature environment. Since the thermal expansion suppressing layer is disposed directly on the magnetic layer and has superior heat dissipation properties, it seems there is little or no risk that thermal protrusion may occur remarkably due to heat generation from the thin film coil. However, because the thermal expansion suppressing layer is disposed directly on the magnetic layer, the third manner has the possibility that, when the thermal expansion suppressing layer is formed by etching process, the magnetic layer located immediately therebelow may also be etched.

On the other hand, in the fourth manner, the thermal expansion suppressing layer is disposed on the magnetic layer with the protective layer formed of alumina or the like disposed in between. Therefore, when the thermal expansion suppressing layer is formed by etching process, the protective layer can protect the magnetic layer located immediately therebelow from etchant. However, with the protective layer disposed between the magnetic layer and the thermal expansion suppressing layer, the thermal conductivity from the magnetic layer to the thermal expansion suppressing layer may be deteriorated, and thus heat dissipation properties is lowered. As a result, heat might be stored inside, resulting in thermal protrusion.

It is desirable to provide a thin film magnetic head capable of suppressing the occurrence of thermal protrusion, and a method of forming the thin film magnetic head, as well as a head gimbal assembly, a head arm assembly, and a magnetic disk device.

According to an embodiment of the present invention, there is provided a thin film magnetic head including a main magnetic pole layer, a return yoke layer, an intermediate protective layer, and a thermal expansion suppressing layer. The main magnetic pole layer extends in a direction to intersect with an air bearing surface opposed to a recording medium, and conducts a magnetic flux to the recording medium so that the recording medium is magnetized in a direction orthogonal to a surface thereof. The return yoke layer is disposed on a trailing side of the main magnetic pole layer. The intermediate protective layer is partially disposed on a magnetic shield layer. The thermal expansion suppressing layer, having an edge located on the intermediate protective layer, is in contact with the magnetic shield layer in an area where the intermediate protective layer is not formed.

According to other embodiment of the present invention, there is provided a head gimbal assembly including a magnetic head slider having on one side surface thereof the above-mentioned thin film magnetic head, and a suspension, one end of which is provided with the magnetic head slider. A head arm assembly of the present invention has the above-mentioned head gimbal assembly and an arm for supporting the above-mentioned suspension at the other end thereof. A magnetic disk device of the present invention has a magnetic recording medium and the above-mentioned head arm assembly.

According to still other embodiment of the present invention, there is provided a method of forming a thin film magnetic head, including the following three steps (A) to (C):

(A) the step of forming a main magnetic pole layer extending in a direction to intersect with an air bearing surface opposed to a recording medium and conducting a magnetic flux so that a recording medium can be magnetized in a direction orthogonal to a surface thereof, forming a return yoke layer on a trailing side of the main magnetic pole layer, and forming an intermediate protective layer partially on the return yoke layer;

(B) the step of, after forming a thermal expansion suppressing layer throughout a surface including that of the intermediate protective layer, forming a mask layer on the thermal expansion suppressing layer, the mask layer having an edge positioned in an area where the intermediate protective layer is disposed below the thermal expansion suppressing layer; and (C) the step of selectively removing the thermal expansion suppressing layer in an area not covered with a mask layer.

In the thin film magnetic head and the method of forming the thin film magnetic head, as well as the head gimbal assembly, the head arm assembly, and the magnetic disk device according to the embodiment, the thermal expansion suppressing layer is disposed on the intermediate protective layer. Thus, even if the thin film magnetic head is affected by ambient temperature environment, the shift of the main magnetic pole layer and the return yoke layer toward the air bearing surface is limited by the thermal expansion suppressing layer. This can suppress thermal protrusion from occurring on the thin film magnetic head due to ambient temperature environment.

In the present invention, the thermal expansion suppressing layer can be formed by, for example, dry etching. Since the edge of the thermal expansion suppressing layer is located on the intermediate protective layer, when forming the thermal expansion suppressing layer, the immediately underlying return yoke layer and the like can be protected against etchant by the intermediate protective layer. This eliminates the risk that the return yoke layer and the like are etched through contact with the etchant.

Further, in the present invention, the thermal expansion suppressing layer is in contact with the return yoke layer in the area where the intermediate protective layer is not formed. Therefore, the heat generated within the thin film magnetic head can be propagated through the return yoke layer to the thermal expansion suppressing layer, and then dissipated from the thermal expansion suppressing layer to the exterior. This suppresses heat from being stored within the thin film magnetic head, thus suppressing thermal protrusion from occurring due to the heat generated within the thin film magnetic head.

Accordingly, the present invention is capable of suppressing the occurrence of thermal protrusion because the shift of the main magnetic pole layer and the return yoke layer toward the air bearing surface is limited, while maintaining high heat dissipation properties by the thermal expansion suppressing layer.

Since in the present invention, the thermal expansion suppressing layer is in contact with the return yoke layer in the area where the intermediate protective layer is not formed, it can be said that the thermal expansion suppressing layer is electrically connected to the magnetic shield layer. At this time, if the return yoke layer is shunted, the thermal expansion suppressing layer cannot be electrified, thus eliminating the risk that reliability is lowered by electrification.

Here, in cases where the intermediate protective layer extends rearward from the air bearing surface, and the thermal expansion suppressing layer extends rearward from a position retracted from the air bearing surface, there is no risk that, for example, when the thin film magnetic head has a low temperature, the thermal expansion suppressing layer is relatively protruded toward the recording medium than the main magnetic pole layer and the return yoke layer. This enables magnetic spacing to be stabilized.

In cases where the intermediate protective layer has an opening part at a position retracted from the air bearing surface, and the thermal expansion suppressing layer is in contact with the return yoke layer through the opening part, there is the advantage that the heat generated within the thin film magnetic head can be propagated through the return yoke layer to the thermal expansion suppression layer, and then dissipated from the thermal expansion suppressing layer to the exterior. There is also the advantage that a certain matter required to be electrically separated from the return yoke layer can be disposed on the intermediate protective layer. This enables the intermediate protective layer to function as an etching stop layer for protecting the return yoke layer and the like against etchant, and also as an insulating layer for electrically separating from the return yoke layer.

In cases where a heating element is disposed at a position retracted from the air bearing surface, by heating the heating element, the main magnetic pole layer and the like can be shifted positively toward the recording medium. At this time, the thermal expansion suppression layer suppresses the return yoke layer or the like immediately below the thermal expansion suppressing layer, from shifting toward the recording medium. Hence, only a certain part for which shift is desired (the main magnetic pole layer or the like) can be selectively shifted toward a recording medium. This enables to control magnetic spacing. Therefore, the magnetic spacing can be stabilized by properly adjusting the amount of shift of the main magnetic pole layer or the like toward the recording medium by using the heating element.

In cases where the layer (such as the intermediate protective layer) being in contact with the bottom surface of the thermal expansion suppressing layer is not planarized by, for example, CMP (chemical mechanical polishing), there is no variations due to planarization in the distance between the thermal expansion suppressing layer and the return yoke layer. Consequently, even if the main magnetic pole layer or the like is slightly shifted toward the recording medium under the influence of ambient temperature environment, the amount of the shift can be approximately equalized in the individual thin film magnetic heads, thus enabling homogenization of the individual characteristics of the thin film magnetic heads.

Other and further objects, features and advantages of the invention will appear more fully from the following description.

DESCRIPTION OF THE PREFERRED EMBODIMENTS

An embodiment of the present invention will now be described in detail with reference to the accompanying drawings.

The configuration of a thin film magnetic head 1 according to an embodiment of the present invention, as well as the configurations of a head gimbal assembly 2, a head arm assembly 300, and a magnetic disk device, each of which is equipped with the thin film magnetic head 1, will be described with reference to FIGS. 1 to 11.

Figure 1:
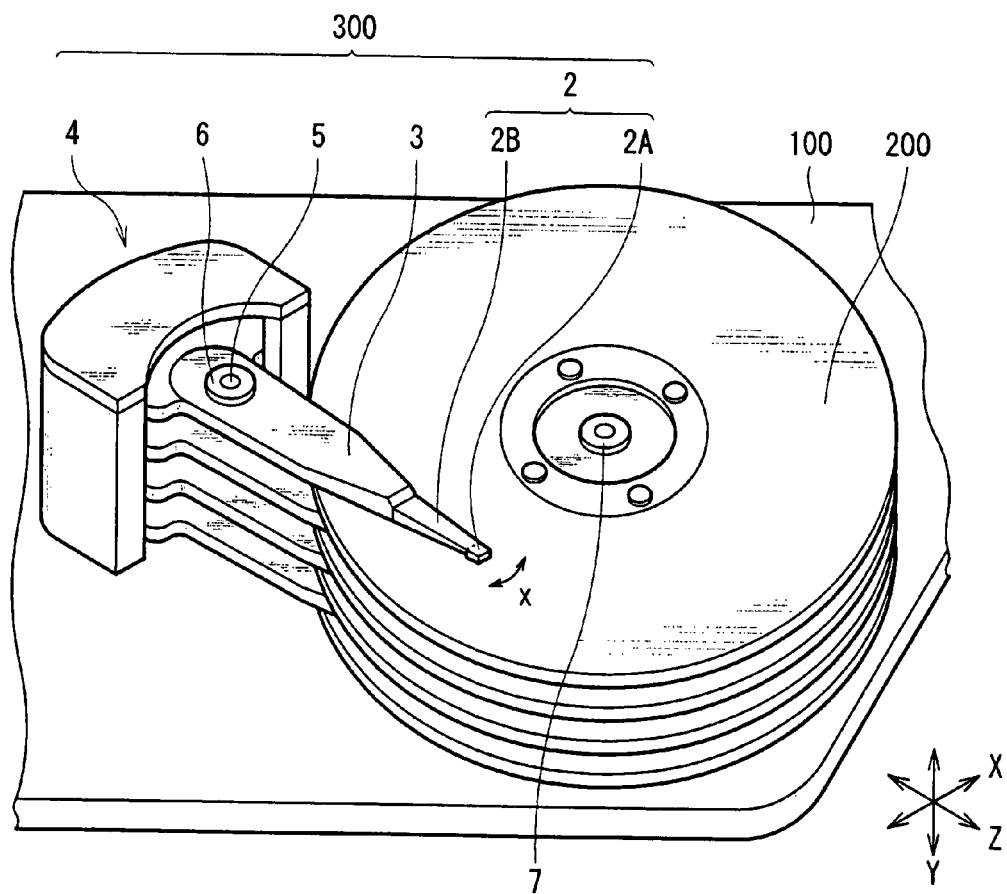
FIG. 1 is a perspective view showing the internal configuration of a magnetic disk device according to an embodiment of the present invention.

FIG. 1 is a perspective view showing the internal configuration of a magnetic disk device according to the present embodiment. In the magnetic disk device, as shown in FIG. 1, a casing 100 houses one or a plurality of (four of which being shown in FIG. 1) magnetic write media 200 (for example, hard disks) capable of writing information, and a head arm assembly (HAA) 300 for writing information in the magnetic write media 200 and for reading the information.

The HAA 300 includes, for example, a head gimbal assembly (HGA) 2, an arm 3, and a driving part 4. The HGA 2 has a magnetic head slider (hereinafter referred to simply as a "slider") 2A is disposed so as to correspond to write surfaces (the top surface and the bottom surface) of each magnetic recording medium 200, and a suspension 2B fixed to one end of the slider 2A. The arm 3 is rotatable, through a bearing 6, about a fixed shaft 5 fixed to the casing 100, and supports the other end of the suspension 2B (the end opposite of the slider 2A). With this configuration, each slider 2A can be moved by the arm 3 in a track width direction (the X-axis direction) of the magnetic recording medium 200 in a plane parallel to the write surface of each magnetic recording medium 200. The driving part 4 is a power source for rotating the arm 3, and includes, for example, a voice coil motor.

The magnetic recording medium 200 is supported rotatably in a direction substantially orthogonal to the X-axis direction, about a spindle motor 7 fixed to the casing 100. Thus, by the rotation of the magnetic recording medium 200 and the movement of the slider 2A, information can be written in the magnetic recording medium 200, or the written information can be read.

Figure 2:
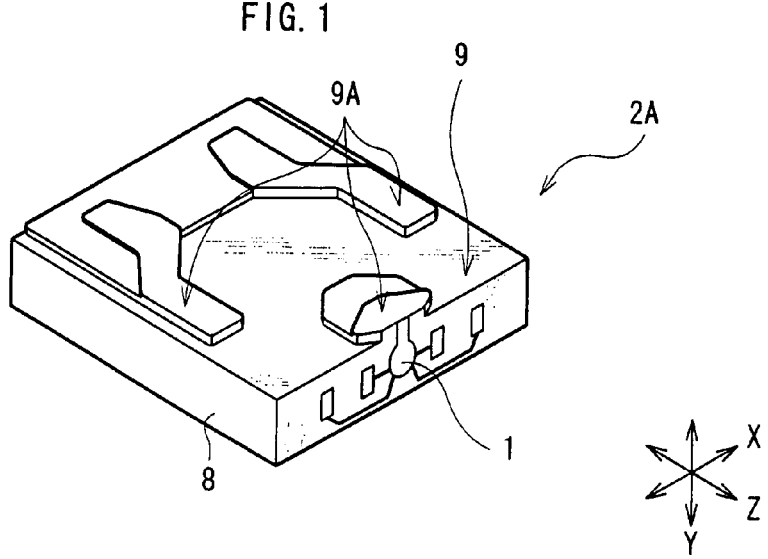
FIG. 2 is a perspective view showing the configuration of a slider in FIG. 1.

FIG. 2 shows an example of the configuration of the slider 2A shown in FIG. 1. The slider 2A has a block-shaped substrate 8 formed of a ceramic material such as Altic ($Al_2O_3TiC$). The substrate 8 is formed in, for example, substantially hexahedron, one surface of which is arranged so as to approach and oppose to the write surface of the magnetic recording medium 200. The surface opposed to the write surface of the magnetic recording medium 200 is a recording medium opposing surface (an air bearing surface) 9. The air bearing surface 9 has a rail 9A for generating lift resulting from an air flow in a direction of shift (the Z-axis direction) of the magnetic recording medium 200 to be caused between the write surface and the air bearing surface 9 when the magnetic recording medium 200 is rotated.

In FIG. 2, there is illustrated a case where the rail 9 is provided at the central part in the X-axis direction on the inlet side of air flow in the slider 2A, and at both ends in the X-axis direction on the outlet side of air flow in the slider 2A. Hereinafter, the inlet side of air flow in the slider 2A is referred to as a leading side, and the outlet side of air flow is referred to as a trailing side.

When the magnetic recording medium 200 is rotated, a certain spacing can be formed between the air bearing surface 9 and the magnetic recording medium 200 by the lift derived from the air flow in the Z-axis direction to be generated between the write surface and the air bearing surface 9.

Figure 3:
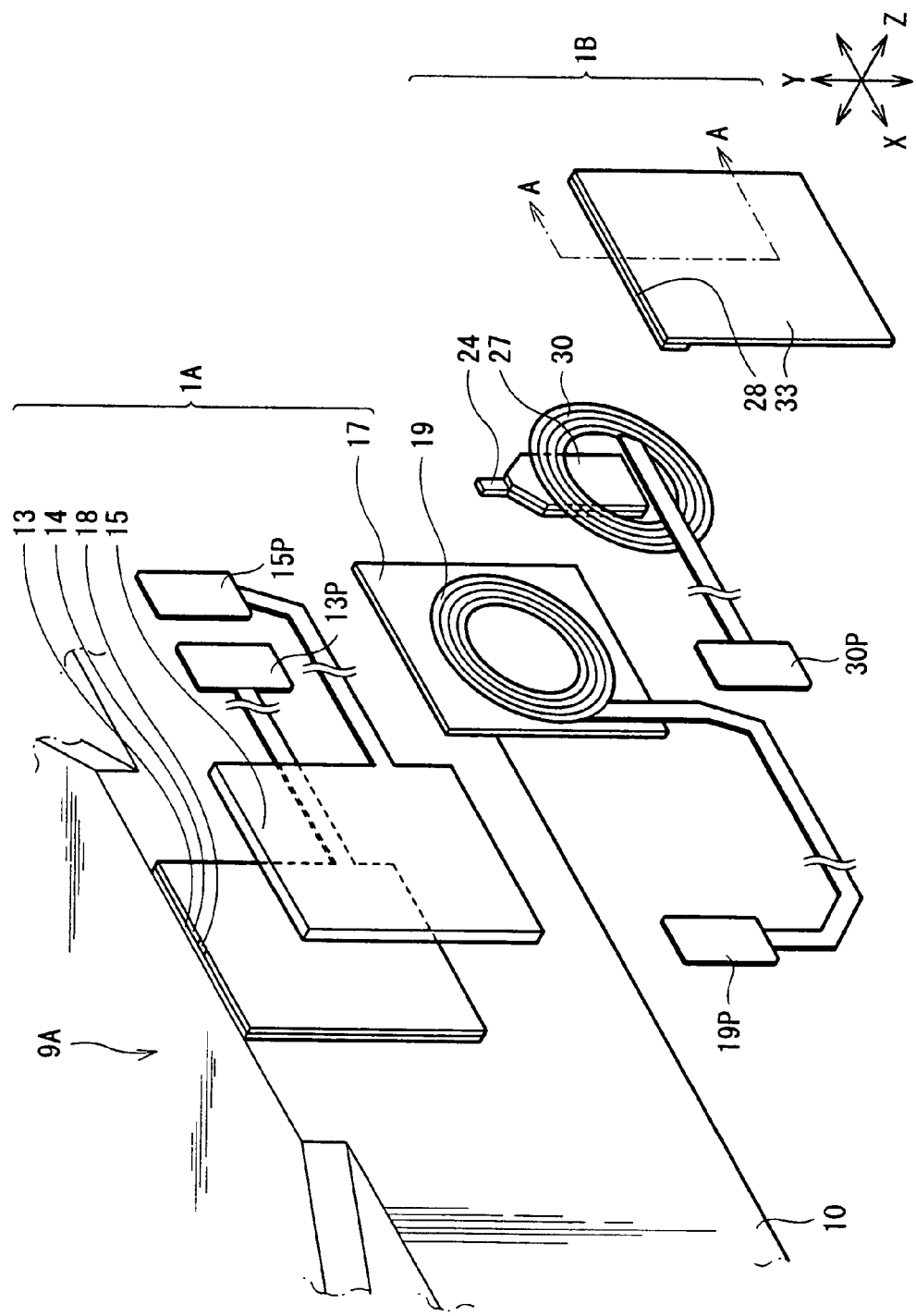
FIG. 3 is an exploded perspective view showing the configuration of a thin film magnetic head in FIG. 1.
Figure 4:
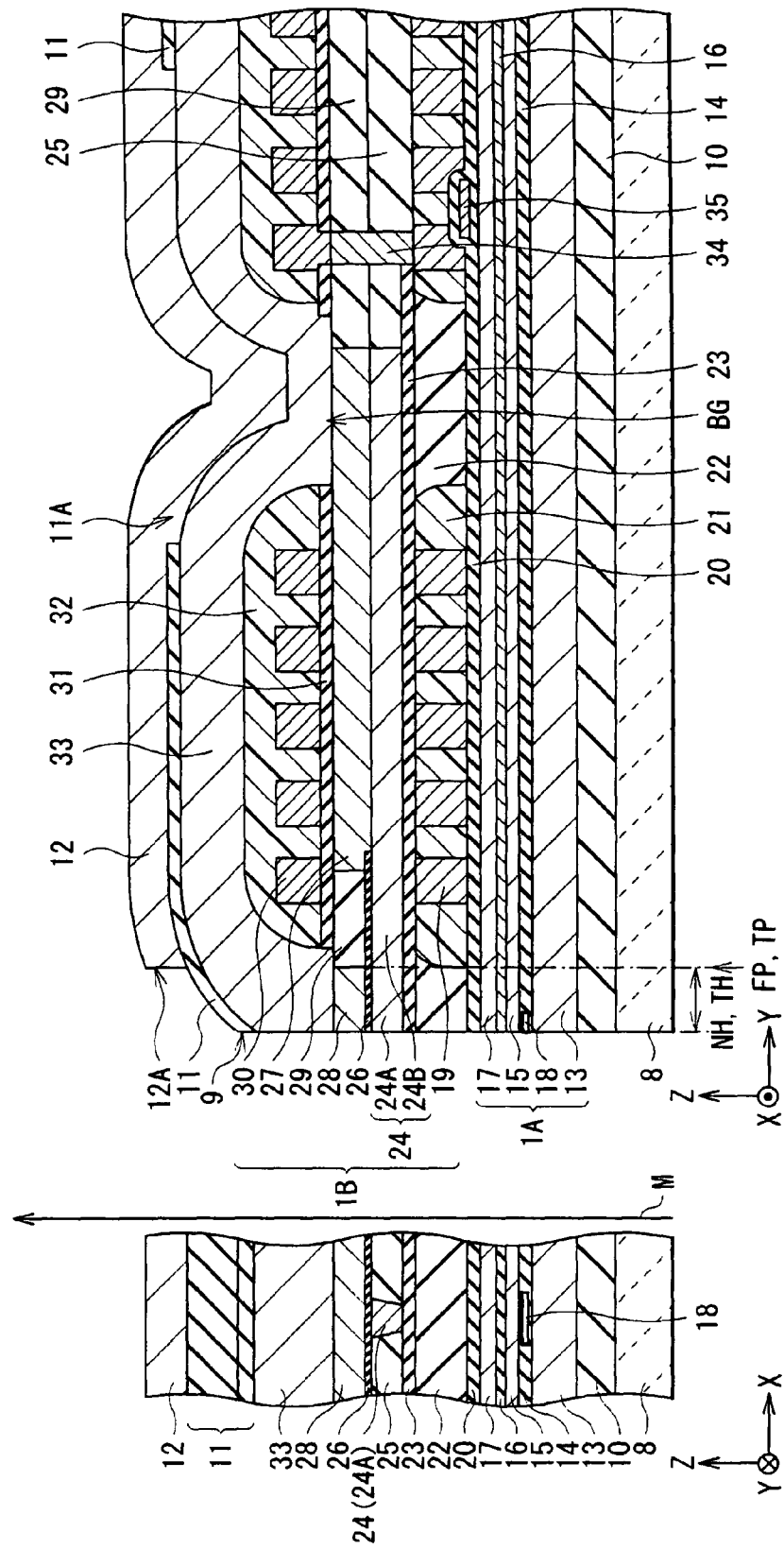
FIG. 4A is a side configuration diagram showing in enlarged dimension a part of the thin film magnetic head which is exposed to an air bearing surface in FIG. 3.
FIG. 4B is a sectional configuration diagram taken in the direction of the arrowed line A-A of the thin film magnetic head in FIG. 3.

As shown in FIG. 2, the thin film magnetic head 1 is disposed on the surface of the trailing side opposed to the air bearing surface 9 of the substrate 8. FIG. 3 shows a case where an example of the configuration of the thin film magnetic head 1 is exploded and shown in perspective. FIG. 4A shows in enlarged dimension a part in the area of the thin film magnetic head 1 in FIG. 3, the part being exposed to the air bearing surface 9. FIG. 4B shows the cross-sectional configuration taken in the direction of the arrowed line A-A in FIG. 3. The thin film magnetic head 1 is for performing magnetic processing to the magnetic recording medium 200, and is a compound type head capable of performing both write and read processing as a magnetic processing.

In the thin film magnetic head 1, for example, an insulating layer 10, a read head part 1A for reading magnetic information written in the magnetic recording medium 200 by using MR (magneto-resistive) effect, a write head part 1B for writing by perpendicular write system, an etching stop layer 11 (an intermediate protective layer), and a thermal expansion suppressing layer 12 are stacked in this order on the substrate 8. In FIG. 3, the etching stop layer 11 and the thermal expansion suppressing layer 12 are omitted.

The insulating layer 10 is formed of a non-magnetic insulating material such as aluminium oxide (for example, $Al_2O_3$) or aluminium nitride (for example, AlN). Since the etching stop layer 11 and the thermal expansion suppression layer 12 are characteristic features in the present embodiment, these will be described later in detail.

As shown in FIG. 3 and FIGS. 4A and 4B, the read head part 1A has a structure that, for example, a lower lead shield layer 13, a shield gap film 14, and an upper lead shield layer 15 are stacked in this order on the insulating layer 10. An MR element 18 is buried in the shield gap film 14 so as to be exposed to the air bearing surface 9.

The lower shield layer 13 and the upper first lead shield layer 15 are for blocking unnecessary magnetic field influence on the MR element 18, and are formed of a magnetic metal material such as nickel-iron alloy (NiFe). The lower lead shield layer 13 and the upper first lead shield layer 15 are formed so as to extend in the Y-axis direction (rearward) from the air bearing surface 9, and their respective one ends are exposed to the air bearing surface 9. That is, the lower lead shield layer 13 and the upper first lead shield layer 15 are arranged oppositely so as to sandwich therebetween the MR element 18 in the stacking direction (the Z-axis direction).

The lower lead shield layer 13 and the upper first lead shield layer 15 have, for example, a rectangular flat shape as shown in FIG. 3. Alternatively, the lower lead shield layer 13 and the upper first lead shield layer 15 may have any shape other than the above shape. For example, these may have a planar configuration in which the width in the X-axis direction on the air bearing surface 9 is smaller than the width in the X-axis direction of the part retracted from the air bearing surface 9. For example, a notch may be provided in the part opposed to the magnetic recording medium 200, the notch extending from the central part in the X-axis direction to both side surfaces orthogonal to the X-axis direction of the magnetic recording medium 200. In consideration of the enhancement of stability of magnetic domain structures, it is preferable that in a cross section parallel to an XY plane of the lower lead shield layer 13 and the upper first lead shield layer 15, the width in the X-axis direction is equal to or larger than the width in the Y-axis direction of these.

The shield gap film 14 is for electrically separating the MR element 18 from its surroundings, and formed of a non-magnetic insulating material such as aluminium oxide or aluminium nitride. The separating layer 16 is formed of a non-magnetic insulating material such as aluminium oxide or aluminium nitride. When the MR element 18 is of CIP (current in plane) type, the separating layer 16 may be formed of a metal material.

An upper second lead shield layer 17 is for entrapping unnecessary magnetic flux released from the lower thin film coil 19 and the main magnetic pole layer 24, and preventing the unnecessary magnetic flux from entering the read head part 1A. The upper second lead shield layer 17 is formed of a magnetic metal material such as nickel-iron alloy (NiFe). The layer 17 has a rectangular planar configuration as shown in FIG. 3. Alternatively, the layer 17 may have any shape other than the above shape, for example, a planar configuration having a notch in the part opposed to the magnetic recording medium 200, the notch extending from the central part in the X-axis direction to both side surfaces orthogonal to the X-axis direction of the magnetic recording medium 200.

The MR element 18 is a magneto-resistive effect element having a stacked structure including a magnetization free layer whose magnetization direction is changed depending on a signal magnetic field from the magnetic recording medium 200. In the magneto-resistive effect element, a sense current flows in the stacking direction. The MR element 18 performs magnetic processing (read processing) by utilizing, for example, giant magneto-resistive (GMR) effect or tunneling magneto-resistive (TMR) effect. As examples utilizing GMR effect, there are CIP (current in plane) type ones or CPP (current perpendicular to the plane) type ones.

The lower lead shield layer 13 is connected to an electrode pad 13P, and the upper first lead shield layer 15 is connected to an electrode pad 15P. These shield layers 13 and 15 also function as a current path for passing current to the MR element 18. Thus, the read head part 1A can read write information by utilizing the change in the electrical resistance of the MR element 18 depending on a signal magnetic field from the magnetic recording medium 200.

Figure 7:
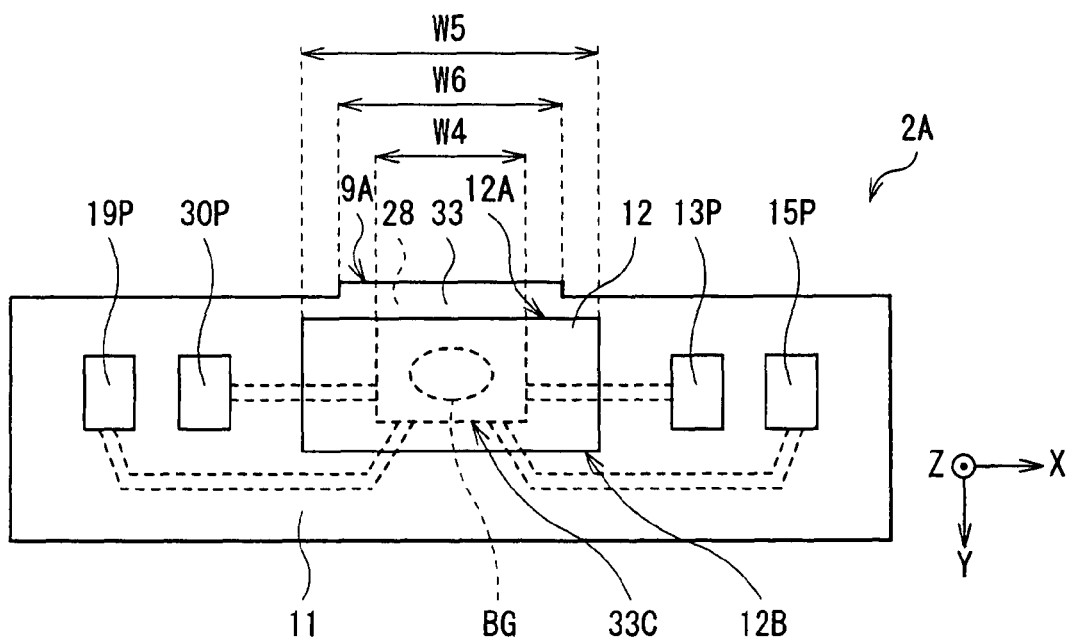
FIG. 7 is a side configuration diagram of a part of the slider of FIG. 1 which is exposed to the air bearing surface.

The electrode pads 13P and 15P are formed of, for example, copper (Cu) or gold (Au), and disposed on the etching stop layer 11, as will be described later (see FIGS. 7 and 8).

The configuration of a write head part 1B will next be described. As shown in FIG. 3 and FIGS. 4A and 4B, the write head part 1B is formed on the upper second lead shield layer 17, and is a perpendicular magnetic write head, so-called shield type head. In the write head part 1B, for example, a lower thin film coil 19 buried in insulating layers 20 to 23, a main magnetic pole layer 24 whose periphery is filled with an insulating layer 25, a gap layer 26, an auxiliary magnetic pole layer 27 and a light shield layer 28, each periphery being filled with a non-magnetic layer 29, an upper thin film coil 30 buried in insulating layers 31 and 32, and a return yoke layer 33 are stacked in this order. The lower thin film coil 19 is connected to an electrode pad 19P, and the upper thin film coil 30 is connected to an electrode pad 30P, so that current can be supplied from these electrode pads 19P and 30P to the lower tin film coil 19 and the upper thin film coil 30.

The lower thin film coil 19 is for generating a magnetic flux used for suppressing leakage, in order to suppress the leakage of a magnetic flux for writing generated in the upper thin film coil 30 (unintentional extension of the magnetic flux for writing up to the read head part 1A). The lower thin film coil 19 is formed of a high conductive material such as copper (Cu), and disposed at a position retracted from the air bearing surface 9, as shown in FIG. 4B. The coil 19 has a spiral structure of being wound about a back gap BG. The number of winding (the number of turns) of the lower thin film coil 19 can be set arbitrarily. Preferably, it agrees with the number of turns of the upper thin film coil 30.

The insulating layer 20 is formed of a non-magnetic insulating material such as aluminium oxide or aluminium nitride, and formed on the upper second lead shield layer 17. The insulating layer 21 is formed of a non-magnetic insulating material such as photoresist (photosensitive resin) or spin on glass (SOG), each exhibiting flowability upon heating. The layer 21 is formed on the insulating layer 20, and fills the periphery of the lower thin film coil 19. The insulating layer 22 is formed of the same material as the insulating layer 20, for example. The insulating layer 22 fills the periphery of the insulating layer 21, and is exposed to the air bearing surface 9. The insulating layer 23 is formed of the same material as the insulating layer 20, for example, and extends over the upper surface of the lower thin film coil 19, the upper surface of the insulating layer 21, and the upper surface of the insulating layer 22. Thus, the lower thin film coil 19 can be electrically separated from its surroundings by the insulating layers 20 to 23.

The main magnetic pole layer 24 is a main magnetic flux releasing portion, and formed of a magnetic material having high saturated magnetic flux density such as iron-based alloy. Examples of the iron-based alloy are iron cobalt alloy (FeCo) and cobalt iron nickel alloy (CoFeNi).

Figure 5:
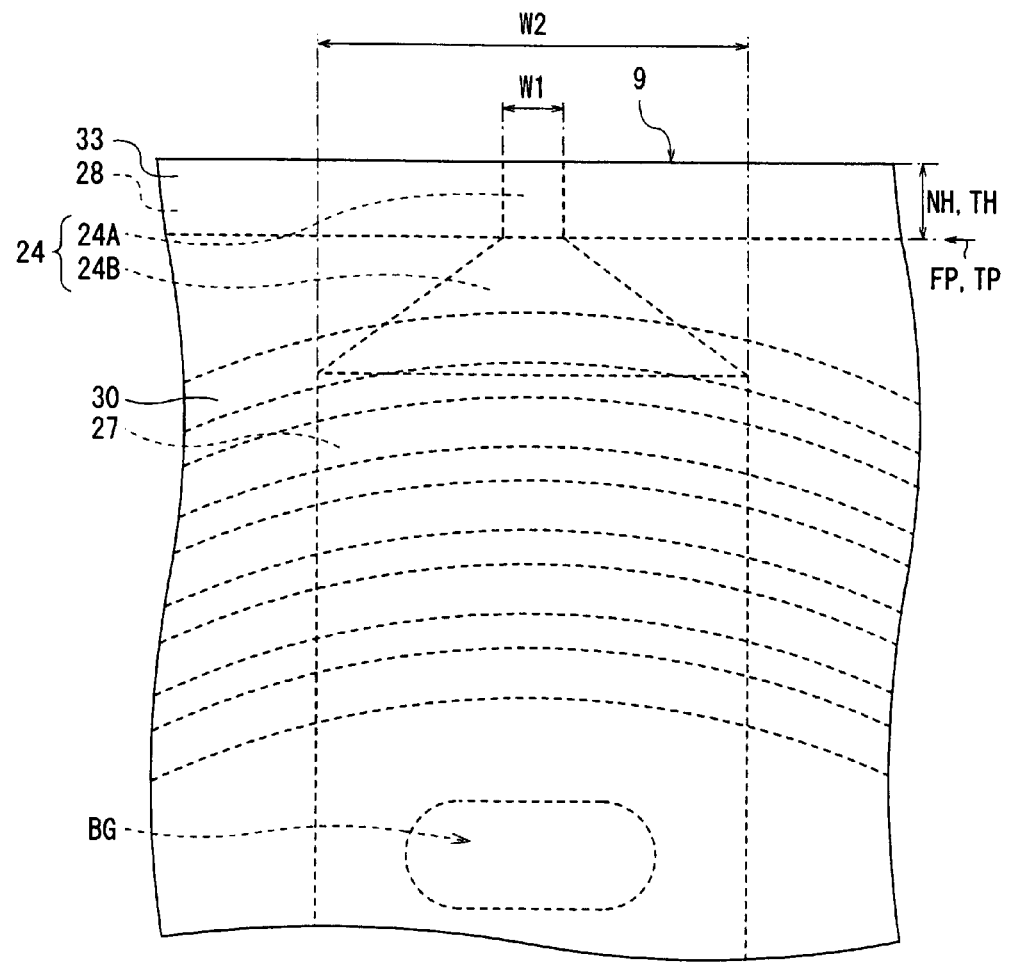
FIG. 5 is a plan configuration diagram showing an example of a main magnetic pole layer and the like in FIG. 1.

The main magnetic pole layer 24 is formed so as to extend from the air bearing surface 9 to the back gap BG (described later), and one end of the main magnetic pole layer 24 is exposed to the air bearing surface 9, as shown in FIG. 4B and FIG. 5. The main magnetic pole layer 24 has, for example, a planar configuration including a tip portion 24 and a rear end portion 24B in this order from the air bearing surface 9 side. The tip portion 24 extends from the air bearing surface 9 in the Y-axis direction. The rear end portion 24B is connected to the tip portion 24A, and extends from the tip portion 24A in the Y-axis direction. The term "connected" means a magnetically condutable state.

The tip portion 24A is a substantially magnetic flux releasing portion (a so-called magnetic pole), and has a certain width defining a write track width. The rear end portion 24B is a portion for supplying a magnetic flux to the tip portion 24A, and has a width W2 larger than the width in the X-axis direction of the tip portion 24A. For example, the width W2 in the X-axis direction of the rear end portion 24B is constant in a portion far apart from the tip portion 24A. In a portion of the rear end 24B which is close to the tip portion 24A, the width W2 is gradually narrowed as the distance to the tip portion 24A is reduced. The position where the width of the main magnetic pole layer 24 is increased from W1 to W2 is a flare point FP, and the distance between the air bearing surface 9 and the flare point FP is a neck height NH.

Figure 6:
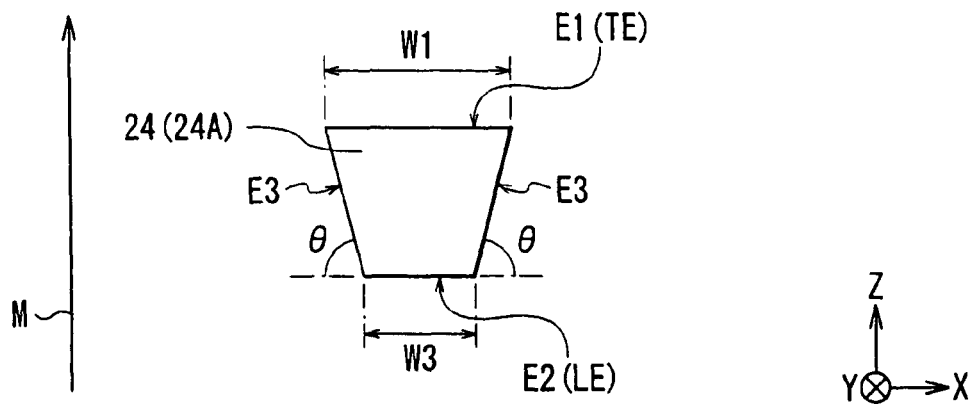
FIG. 6 is a side configuration diagram showing in enlarged dimension a part of the main magnetic pole layer which is exposed to the air bearing surface in FIG. 5.

The end face of the main magnetic pole layer 24 in the air bearing surface 9 has a reverse trapezoidal shape whose upper bottom and lower bottom are a longer side located on the trailing side and a shorter side located on the leading side, respectively, as shown in FIG. 6. More specifically, the end face of the main magnetic pole layer 24 has a shape defined by an upper edge E1 (the width W1) located on the trailing side, a lower edge E2 (a width W3) located on the leading side, and two side edges E3. The width W3 is smaller than the width W1. The upper edge E1 is a substantially write portion (a so-called trailing edge TE) of the main magnetic pole layer 24, and the width W1 is about 0.2 μm or below. A bevel angle θ, namely an angle between the direction of extension of the lower edge E2 and the side edge E3 can be set arbitrarily in a range of below 90°.

As used herein, the term "leading side" means, when the dynamic state of the magnetic recording medium 200 traveling to a medium traveling direction M (the direction in which the magnetic recording medium 200 moves relatively to the thin film magnetic head 1) is regarded as a flow, the side on which the flow comes off (the front side in the medium traveling direction M), that is, it means here the upper side in the thickness direction (the Z-axis direction). On the other hand, the side on which the flow comes in (the rear side in the medium traveling direction M) is called "leading side," and it means here the lower side in the thickness direction.

The insulating layer 25 is for electrically separating the main magnetic pole layer 24 from its surroundings, and formed of a non-magnetic insulating material such as aluminium oxide ($Al_2O_3$) or aluminium nitride (AlN). The insulating layer 25 is disposed on the insulating layer 23 and fills the periphery of the main magnetic pole layer 24. The insulating layer 25 is provided with a U-shaped groove extending from the air bearing surface 9 to the end on the air bearing surface 9 of the auxiliary magnetic pole layer 27. A tip portion 24A (described later) of the main magnetic pole layer 24 is buried within the groove.

The gap layer 26 is formed of a non-magnetic material such as alumina, and extends from the air bearing surface 9 to the front end of the auxiliary magnetic pole layer 27, while making contact with the upper surface of the main magnetic pole layer 24. A portion of the gap layer 26 which is sandwiched between the main magnetic pole layer 24 and the light shield layer 28 is a magnetic gap for magnetically separating the two. This portion has a thickness of about 0.03 μm to 0.1 μm.

The auxiliary magnetic pole layer 27 is a main magnetic flux accommodating portion, and formed of a magnetic material having a low saturated magnetic flux density than the magnetic material of the main magnetic pole layer 24. The auxiliary magnetic pole layer 27 extends from the position retracted from the air bearing surface 9 to the back gap BG, as shown in FIG. 4B and FIG. 5. Like the rear end portion 24B of the main magnetic pole layer 24, the layer 27 has, for example, a rectangular flat shape having the width W2. The auxiliary magnetic pole layer 27 is magnetically connected to the main magnetic pole layer 24, and disposed on the trailing side (the upper side as viewed in FIG. 4B) of the main magnetic pole layer 24. That is, the main magnetic pole layer 24 and the auxiliary magnetic pole layer 27 have a top yoke type structure. Alternatively, the auxiliary magnetic pole layer 27 may be disposed on the leading side of the main magnetic pole layer 24. For earning the amount of magnetic flux accommodation (so-called magnetic volume), the auxiliary magnetic pole layer 27 has a larger thickness than the main magnetic pole layer 24, and has a thickness of about 0.5 μm to 1 μm.

The light shield layer 28 entraps an expansion composition in a magnetic flux introduced from the main magnetic pole layer 24 to the magnetic recording medium 200, in order to (1) increase the magnetic field gradient of a perpendicular magnetic field, (2) reduce the write width, and (3) incorporate an oblique magnetic field composition into the perpendicular magnetic field. The light shield layer 28 is disposed on the same hierarchy as the auxiliary magnetic pole layer 27 so as to be disposed in an area in front of the layer 27. The light shield layer 28 extends from the air bearing surface 9 to a position in front of the auxiliary magnetic pole layer 27, while being separated from the main magnetic pole layer 24 by the gap layer 26. The light shield layer 28 is formed of a magnetic material such as permalloy or iron-cobalt based alloy, and has a rectangular flat shape having a width W4 larger than the width W2 of the auxiliary magnetic pole layer 27 (refer to FIGS. 5 and 7). A non-magnetic layer 29 defining a throat height zero position TP is adjacent to the rear end of the light shield layer 28. That is, the light shield layer 28 has the function of substantially defining, by the rear end thereof, the throat height zero position TP.

The non-magnetic layer 29 is for defining, by the forwardmost end thereof, the throat height zero position TP, and formed of a non-magnetic insulating material such as aluminium oxide ($Al_2O_3$) or aluminium nitride (AlN), or a non-magnetic conductive material such as ruthenium. The distance between the air bearing surface 9 and the throat height zero position TP is a throat height TH. In FIG. 4B and FIG. 5, there is shown the case where the throat height zero position TP agrees with the flare point FP.

The non-magnetic layer 29 is disposed on the same hierarchy as the auxiliary magnetic pole layer 27 so as to be disposed in an area in front of the layer 27, for example, disposed between the layer 27 and the light shield layer 28. Here, the non-magnetic layer 29 is disposed not only in an area in front of the layer 27, but also buries the periphery of the layer 27.

An upper thin film coil 30 is for generating a magnetic flux for writing, and it is formed of a high conductive material, such as copper (Cu), and disposed at a position retracted from the air bearing surface 9, as shown in FIG. 4B. The coil 30 has a spiral structure of being wound about the back gap BG. The upper thin film coil 30 is electrically connected through a via 34 to the lower thin film coil 19, so that current flows in the reverse direction of the direction in which current flows in the lower thin film coil 19. The number of winding (the number of turns) of the lower thin film coil 19 can be set arbitrarily. Preferably, it agrees with the number of turns of the upper thin film coil 30.

An insulating layer 31 is the base of the upper thin film coil 30, and formed of, for example, the same non-magnetic insulating material as the insulating layer 20. An insulating layer 32 covers the upper thin film coil 30, together with the insulating layer 31. The insulating layer 32 is formed of, for example, the same non-magnetic insulating material as the insulating layer 21. These are disposed so as not to block the back gap BG, and connected to the non-magnetic layer 29. The forwardmost end of each of the insulating layers 31 and 32 is retracted from, for example, the forwardmost end of the non-magnetic layer 29.

A return yoke layer 33 is for circulating a magnetic flux between the thin film magnetic head 1 and the recording medium 200, by absorbing the magnetic flux after writing (the magnetic flux used for write processing in the recording medium 200), and then resupplying this to the main magnetic pole layer 24 and the auxiliary magnetic pole layer 27. The return yoke layer 33 is formed of a magnetic metal material (for example, permalloy) having a high saturated magnetic flux density, such as iron-based alloy. The return yoke layer 33 has, for example, a rectangular flat shape as shown in FIGS. 3 and 7. Alternatively, the first return yoke layer 33 may have any shape other than the above shape, for example, a flat shape of substantially strap type. For example, a notch may be provided in the part opposed to the magnetic recording medium 200, so that it extends from the central part in the X-axis direction to both side surfaces orthogonal to the X-axis direction of the magnetic recording medium 200. The return yoke layer 33 extends from the air bearing surface 9 to a position (an edge 33C) between the back gap BG and the portion of the insulating layer 32 which is the remotest from the air bearing surface 9, so that the return yoke layer 33 covers part of the insulating layer 32. The return yoke layer 33 is spread over and connected to the light shield layer 28 on the air bearing surface 9 side, and also connected through the back gap BG to the auxiliary magnetic pole layer 27. That is, the return yoke layer 33 is provided on the surface including the insulating layer 32, and a portion of the auxiliary magnetic pole layer 27 which is opposed to the back gap BG.

In the present embodiment, a heating element 35 is buried in a position apart from the air bearing surface 9, for example as shown in FIG. 4B, a position in the insulating layer 20, apart a predetermined distance from the air bearing surface 9. The heating element 35 is for heating itself in order to positively generate thermal protrusion in the main magnetic pole layer 24. The heating element 35 is formed of a heater coil, for example.

The above-mentioned etching stop layer 11 and the thermal expansion suppressing layer 12 will be described below.

The etching stop layer 11 contains at least one of a non-magnetic insulating material such as aluminium oxide (for example, $Al_2O_3$) and silicon oxide (for example, $SiO_2$), and is disposed partially on the return yoke layer 33. As shown in FIG. 4B and FIG. 7, the etching stop layer 11 extends rearward from the air bearing surface 9, and has an opening at a location corresponding to the back gap BG. That is, in FIG. 4B and FIG. 7, the etching stop layer 11 covers all the area on the upper surface of the return yoke layer 33, except for the opening and the electrode pads 13P, 15P, 19P, and 30P. FIG. 7 is a side view when the slider 2A in FIG. 2 is viewed from the trailing side, and the broken line in the figure shows schematically the area not exposed to the side surface on the trailing side.

Here, in cases where the etching stop layer 11 is formed throughout the end face on the trailing side of the slider 2A, the etching stop layer 11 also functions as an insulating layer, by which the return yoke layer 33 and the electrode pads 13P, 15P, 19P, and 30P are insulated from each other.

Preferably, the surface of the etching stop layer 11 is not planarized by, for example, CMP (chemical mechanical polishing). This is because the distance in the Z-axis direction between the thermal expansion suppressing layer 12 and the return yoke layer 33 formed on the etching stop layer 11 is substantially equalized in each thin film magnetic head 1, without causing variations as would be the case with planarization.

The thermal expansion suppressing layer 12 contains at least one of low thermal expansion materials having a smaller coefficient of thermal expansion and a larger thermal conductivity than the etching stop layer 11, such as silicon oxide, silicon carbide (SiC), silicon nitride (SiN), aluminium nitride, and aluminium carbide. As shown in FIG. 4B, the thermal expansion suppressing layer 12 is one that an edge 12A on the air bearing surface 9 side is disposed at least on the etching stop layer 11, and is in contact with the return yoke layer 33 through the area where the etching stop layer 11 is not formed (the opening part 11A). The thermal expansion suppressing layer 12 extends rearward from a position retracted from the air bearing surface 9. That is, the thermal expansion suppressing layer 12 has a relatively recessed shape with respect to the magnetic pole layer 18 in the air bearing surface 9. Preferably, the thermal expansion suppressing layer 12 has such a dimension as to cover the entire return yoke layer 33 (except for the vicinity of the air bearing surface 9), as shown in FIG. 7. Preferably, a width W5 in the X-axis direction of the thermal expansion suppressing layer 12 is substantially equal to or larger than a width W6 in the X-axis direction of a portion disposed in the vicinity of the air bearing surface 9 in the rail 9A.

Figure 8:
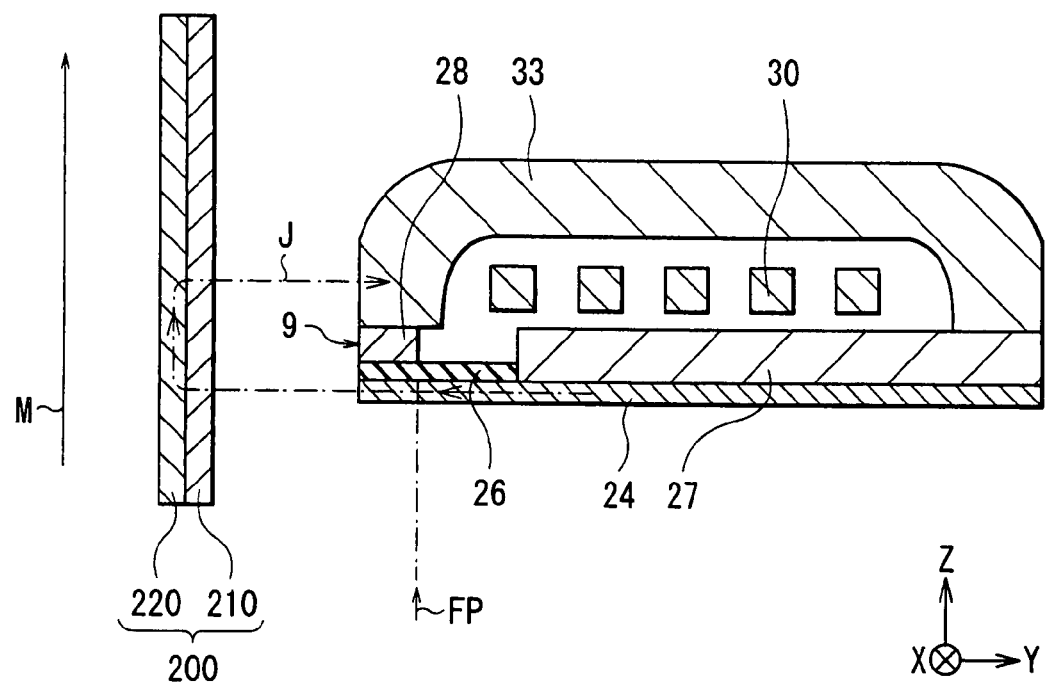
FIG. 8 is a sectional configuration diagram for explaining the relationship between the thin film magnetic head and a magnetic recording medium in FIG. 1.

The magnetic recording medium 200 includes a magnetization layer 210 and a soft magnetic layer 220 which are arranged in sequence from the side close to the thin film magnetic head 1, as shown in FIG. 8. The magnetization layer 210 is capable of magnetically writing information. The soft magnetic layer 220 functions as a magnetic flux path (a so-called flux pass) in the magnetic recording medium 200. This type of the magnetic recording medium 200 is generally called two-layer recording medium for perpendicular writing. Of course, the magnetic recording medium 200 may include other layer, together with the above-mentioned magnetization layer 210 and the soft magnetic layer 220.

An example of a method of manufacturing the thin film magnetic head 1 will be described below. The following description is made mainly of a method of forming the etching stop layer 11 and the thermal expansion suppressing layer 12, which is one of the characteristic features of the present embodiment.

Figures 9A, 9B:
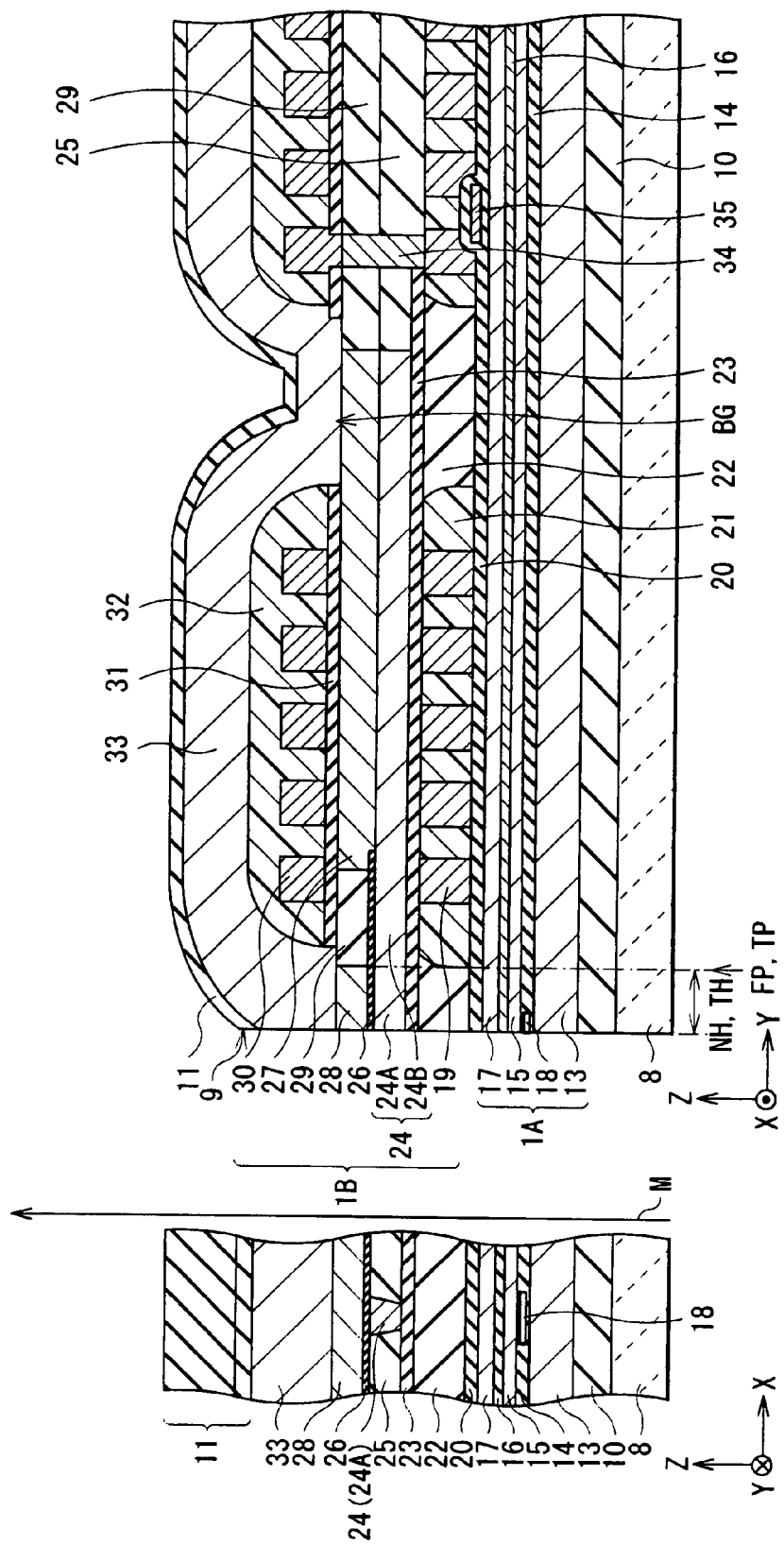
FIG. 9A is a side configuration diagram showing in enlarged dimension a part of the thin film magnetic head which is exposed to the air bearing surface in FIG. 3 for explaining a manufacturing step of the thin film magnetic head in FIG. 1.
FIG. 9B is a sectional configuration diagram taken in the direction of the arrowed line A-A of the thin film magnetic head in FIG. 3 for explaining a manufacturing step of the thin film magnetic head in FIG. 1.
Figures 10A, 10B:
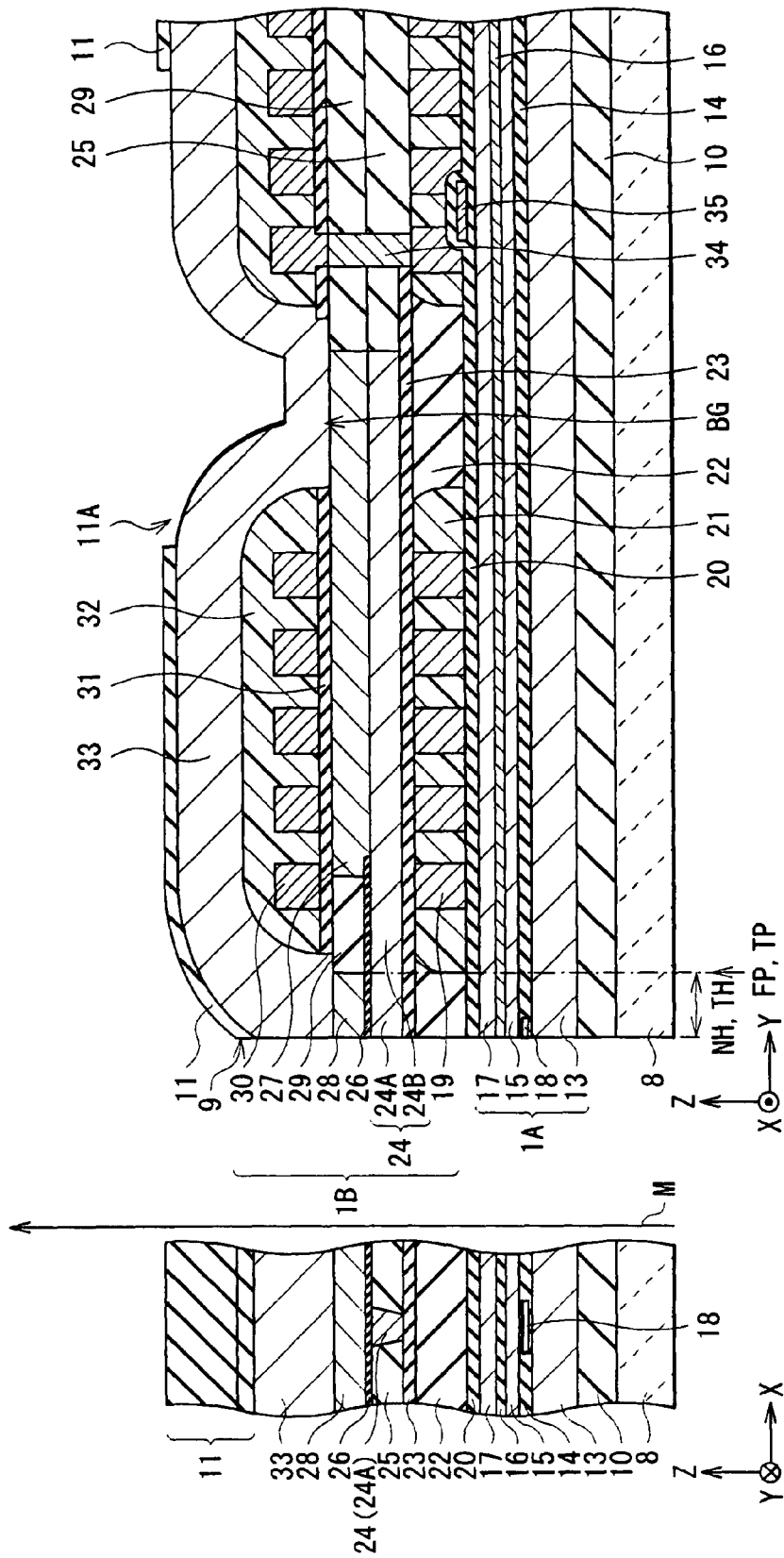
FIG. 10A is a side configuration diagram for explaining the next succeeding step of that in FIG. 9.
FIG. 10B is a sectional configuration diagram for explaining the next succeeding step of that in FIG. 9.

Firstly, a read head part 1A and a write head part 1B are formed. Then, by using sputtering method, for example, an etching stop layer 11 formed of a non-magnetic insulating material is formed over the entire surface of a return yoke layer 33 (FIGS. 9A and 9B). Subsequently, a photoresist layer (not shown) having an opening is formed in an area corresponding to a back gap BG on the etching stop layer 11. Thereafter, by using dry etching method such as RIE (reactive ion etching), the area corresponding to the opening of the photoresist layer in the etching stop layer 11 is then removed (refer to FIGS. 10A and 10B). Alternatively, the etching stop layer 11 may be formed by other method such as lift off.

Figures 11A, 11B:
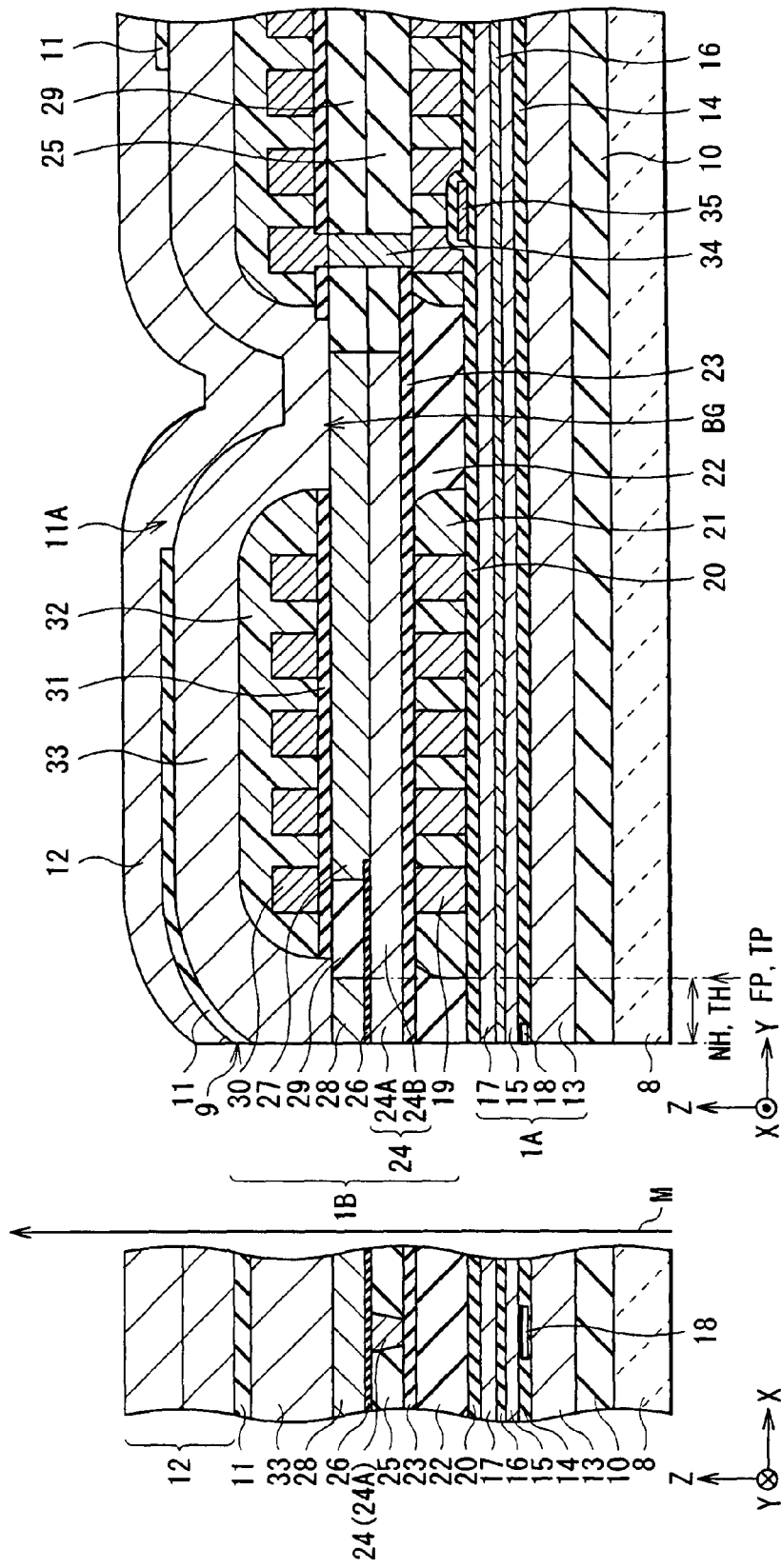
FIG. 11A is a side configuration diagram for explaining the next succeeding step of that is FIG. 10.
FIG. 11B is a sectional configuration diagram for explaining the next succeeding step of that in FIG. 10.
Figures 12A, 12B:
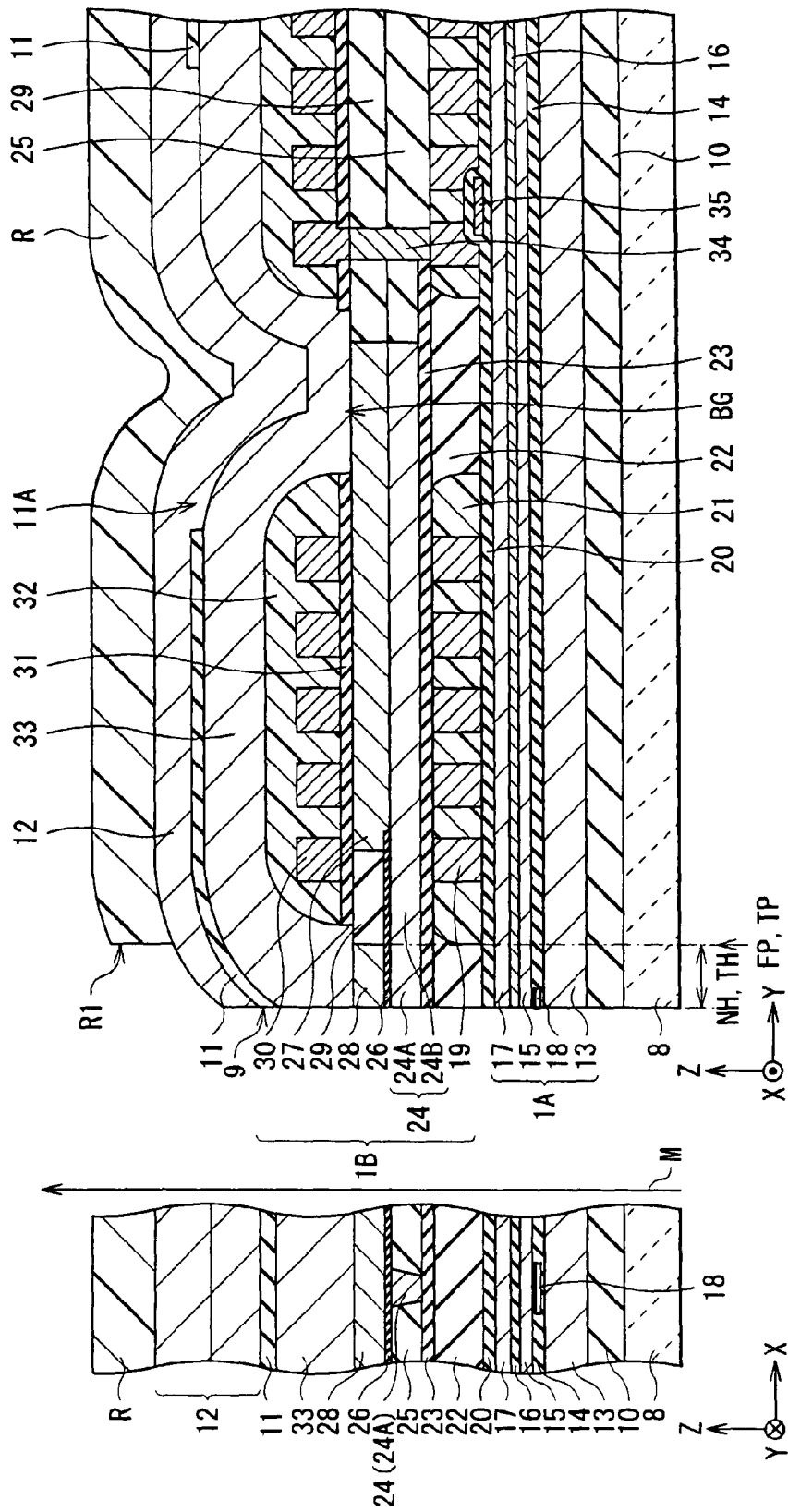
FIG. 12A is a side configuration diagram for explaining the next succeeding step of that in FIG. 11.
FIG. 12B is a sectional configuration diagram for explaining the next succeeding step of that in FIG. 11.

The photoresist layer is then removed. By using sputtering method, for example, a thermal expansion suppressing layer 12 formed of a low thermal expansion material having a smaller coefficient of thermal expansion and a larger thermal conductivity than the etching stop layer 11 is formed over the entire surface including the etching stop layer 11 (FIGS. 11A and 11B). Subsequently, a photoresist layer R having an edge (for example, R1) is formed in an area where the etching stop layer 11 is disposed under the thermal expansion suppressing layer 12 (refer to FIGS. 12A and 12B). Then, by dry etching method such as RIE (reactive ion etching), the part of the thermal expansion suppressing layer 12 which is not covered with the photoresist layer, by using the photoresist layer as a mask layer (refer to FIG. 4B).

The operation of the thin film magnetic head 1 is as follows. That is, a magnetic flux for writing is generated when a current flows from an external circuit (not shown) to the lower thin film coil 19 and the upper thin film coil 30 of the write head part 1B during the time of writing information. This magnetic flux is accommodated in the auxiliary magnetic pole layer 27 and the main magnetic pole layer 24, and the magnetic flux then flows toward the tip portion 24A. At this time, the magnetic flux is converged for focusing at the flare point FP, and finally concentrated in the vicinity of the tip portion 24A. When the magnetic flux concentrated in the vicinity of the tip portion 24A is released outside to thereby generate a perpendicular magnetic field, the perpendicular magnetic field magnetizes the magnetization layer of the magnetic recording medium 200, so that information can be magnetically written in the magnetic recording medium 200.

In this case, the light shield layer 28 entraps the expansion composition in the magnetic flux released from the main magnetic pole layer 24, and therefore the gradient of the perpendicular magnetic field can be increased. At this time, the magnetic flux entrapped by the light shield layer 29 is passed through the return yoke layer 33, and resupplied to the main magnetic pole layer 24.

The magnetic flux released from the main magnetic pole layer 24 to the magnetic recording medium 200 magnetizes the magnetization layer 210 in the magnetic recording medium 200, and passes through the soft magnetization layer 220, and is then entrapped by the return yoke layer 33. At this time, the light shield layer 28 also entraps part of the magnetic flux. The magnetic flux entrapped by the light shield layer 28 and the return yoke layer 33 is also resupplied to the main magnetic pole layer 24. This enables the magnetic flux to be circulated between the write head part 1B and the magnetic recording medium 200, thereby configuring a magnetic circuit.

On the other hand, during the time of reading information, when a sense current flows to the MR element 18 of the read head part 1A, the resistance value of the MR element 18 changes depending on a signal magnetic field for reading sent from the magnetic recording medium 200. The change in the resistance can be detected as a voltage change, so that the information written in the magnetic recording medium 200 can be read magnetically.

In the present embodiment, the thermal expansion suppressing layer 12 is disposed on the etching stop layer 11. Thus, even if the thin film magnetic head 1 is affected by ambient temperature environment, the shift of the main magnetic pole layer 24 and the return yoke layer 33 toward the air bearing surface 9 is limited by the thermal expansion suppressing layer 12. This can suppress thermal protrusion from occurring on the thin film magnetic head due to ambient temperature environment.

In the present invention, the thermal expansion suppressing layer 12 is formed by, for example, dry etching. Since the edge 12A of the thermal expansion suppressing layer 12 is disposed at least on the etching stop layer 11, when forming the thermal expansion suppressing layer 12, the immediately underlying return yoke layer 33 and the like can be protected from etchant by the etching stop layer 11. This eliminates the risk that the return yoke layer 33 and the like are etched through contact with the etchant.

Further, in the present embodiment, the thermal expansion suppressing layer 12 is in contact with the return yoke layer 33 in the area where the etching stop layer 11 is not formed. Therefore, the heat generated within the thin film magnetic head 1 can be propagated through the return yoke layer 33 to the thermal expansion suppressing layer 12, and then dissipated from the thermal expansion suppressing layer 12 to the exterior or the like. This suppresses heat from being stored within the thin film magnetic head 1, thus suppressing thermal protrusion from occurring due to the heat generated within the thin film magnetic head 1.

Accordingly, the present embodiment is capable of suppressing the occurrence of thermal protrusion, because the shift of the main magnetic pole layer 24 and the return yoke layer 33 toward the air bearing surface 9 is limited, while maintaining high heat dissipation properties by the thermal expansion suppressing layer 12.

In the present embodiment, the thermal expansion suppressing layer 12 is in contact with the return yoke layer 33 in the area where the etching stop layer 11 is not formed. Therefore, it can be said that the thermal expansion suppressing layer 12 is electrically connected to the return yoke layer 33. Hence, when the return yoke layer 33 is shunted, the thermal expansion suppressing layer 12 cannot be electrified, thus eliminating the risk that reliability is lowered by electrification.

Further, in the present embodiment, the etching stop layer 11 extends rearward from the air bearing surface 9, and the thermal expansion suppressing layer 12 extends rearward from a position retracted from the air bearing surface 9. Therefore, there is no risk that, for example, when the thin film magnetic head 1 has a low temperature, the thermal expansion suppressing layer 12 comes into a state protruding toward the magnetic recording medium 200 from the main magnetic pole layer 24 and the return yoke layer 33. This enables magnetic spacing to be stabilized.

Further, in the present embodiment, the etching stop layer 11 has the opening at the position retracted from the air bearing surface 9, and the thermal expansion suppressing layer 12 is connected through the opening part 11A to the return yoke layer 33. Consequently, there is the advantage that the heat generated within the thin film magnetic head 1 can be propagated through the return yoke layer 33 to the thermal expansion suppression layer 12, and then dissipated from the thermal expansion suppressing layer 12 to the exterior or the like. There is also the advantage that a certain matter required to be electrically separated from the return yoke layer 33 can be disposed on the etching stop layer 11. This enables the etching stop layer 11 to function as an etching stop layer for protecting the return yoke layer 33 and the like against etchant, and also as an insulating layer for electrically separating from the return yoke layer 33.

Further, in the present embodiment, the heating element 35 is disposed at the position retracted from the air bearing surface 9. Therefore, by heating the heating element 35, the main magnetic pole layer 24 and the like can be shifted positively toward the magnetic recording medium 200. At this time, with regard to the return yoke layer 33 and the like immediately below the thermal expansion suppressing layer 12, the thermal expansion suppression layer 12 suppresses them from shifting toward the magnetic recording medium 200. Consequently, only a certain part for which shift is desired (the main magnetic pole layer 24 or the like) can be selectively shifted toward the magnetic recording medium 200. This enables to control magnetic spacing. Therefore, the magnetic spacing can be stabilized by properly adjusting the amount of shift of the main magnetic pole layer 24 or the like toward the magnetic recording medium 200, by using the heating element 35.

Further, in the present embodiment, the layer (such as the etching stop layer 11) being in contact with the bottom surface of the thermal expansion suppressing layer 12 is not planarized by, for example, CMP, there is no variations due to planarization in the distance between the thermal expansion suppressing layer 12 and the return yoke layer 33. Consequently, even if the main magnetic pole layer 24 or the like is slightly shifted toward the recording medium under the influence of ambient temperature environment, the amount of the shift can be substantially equalized in the individual thin film magnetic heads, thus enabling homogenization of the individual characteristics of the thin film magnetic heads.

While the present invention has been described through the embodiment and example, it should be noted that the present invention is not limited to the foregoing and numerous modifications and variations can be devised. For example, the lower thin film coil 19, the heating element 35, or the like may be omitted.

What is claimed is:

1. A thin film magnetic head comprising:
    a main magnetic pole layer extending in a direction to intersect with an air bearing surface opposed to a recording medium, and conducting a magnetic flux to the recording medium so that the recording medium is magnetized in a direction orthogonal to a surface thereof;
    a return yoke layer disposed on a trailing side of the main magnetic pole layer;
    an intermediate protective layer partially disposed on and in contact with the return yoke layer; and
    a thermal expansion suppressing layer having an edge located on the intermediate protective layer, and being in contact with the return yoke layer in an area where the intermediate protective layer is not formed.

2. The thin film magnetic head according to claim 1 wherein, the return yoke layer is opposed to the main magnetic pole layer with a gap in between in the vicinity of the air bearing surface and extends rearward.

3. The thin film magnetic head according to claim 1 wherein,
    the intermediate protective layer extends rearward from the air bearing surface; and
    the thermal expansion suppressing layer extends rearward from a position retracted from the air bearing surface.

4. The thin film magnetic head according to claim 1 wherein,
    the intermediate protective layer has an opening at a position retracted from the air bearing surface; and
    the thermal expansion suppressing layer extends through the opening to contact with the return yoke layer.

5. The thin film magnetic head according to claim 1 wherein the intermediate protective layer contains at least one of aluminium oxide and silicon oxide.

6. The thin film magnetic head according to claim 1 wherein the thermal expansion suppressing layer has a lower coefficient of thermal expansion and a higher thermal conductivity than the intermediate protective layer.

7. The thin film magnetic head according to claim 1 wherein the thermal expansion suppressing layer contains at least one of silicon oxide and aluminium nitride.

8. The thin film magnetic head according to claim 1, further comprising a heating element disposed at a position retracted from the air bearing surface.

9. A head gimbal assembly comprising:
    a magnetic head slider having on one side surface thereof a thin film magnetic head according to claim 1; and
    a suspension, one end of which is provided with the magnetic head slider.

10. A head arm assembly comprising:
    a magnetic head slider having on one side surface thereof a thin film magnetic head according to claim 1;
    a suspension, one end of which is provided with the magnetic head slider; and
    an arm supporting the suspension at the other end thereof.

11. A magnetic disk device provided with a magnetic recording medium and a head arm assembly, the head arm assembly comprising:
    a magnetic head slider having on one side surface thereof a thin film magnetic head according to claim 1;
    a suspension, one end of which is provided with the magnetic head slider; and
    an arm supporting the suspension at the other end thereof.

12. A method of forming a thin film magnetic head comprising steps of:
    forming a main magnetic pole layer extending in a direction to intersect with an air bearing surface opposed to a recording medium, and conducting a magnetic flux so that a recording medium is magnetized in a direction orthogonal to a surface thereof;
    forming a return yoke layer on a trailing side of the main magnetic pole layer;
    forming an intermediate protective layer partially on the return yoke layer;
    forming a thermal expansion suppressing layer throughout a surface including on the intermediate protective layer and in contact with the return yoke,
    forming a mask layer on the thermal expansion suppressing layer, the mask layer having an edge positioned in an area where the intermediate protective layer is disposed below the thermal expansion suppressing layer; and
    selectively removing the thermal expansion suppressing layer in an area not covered with a mask layer.

* * * * *